Patented Sept. 4, 1928.

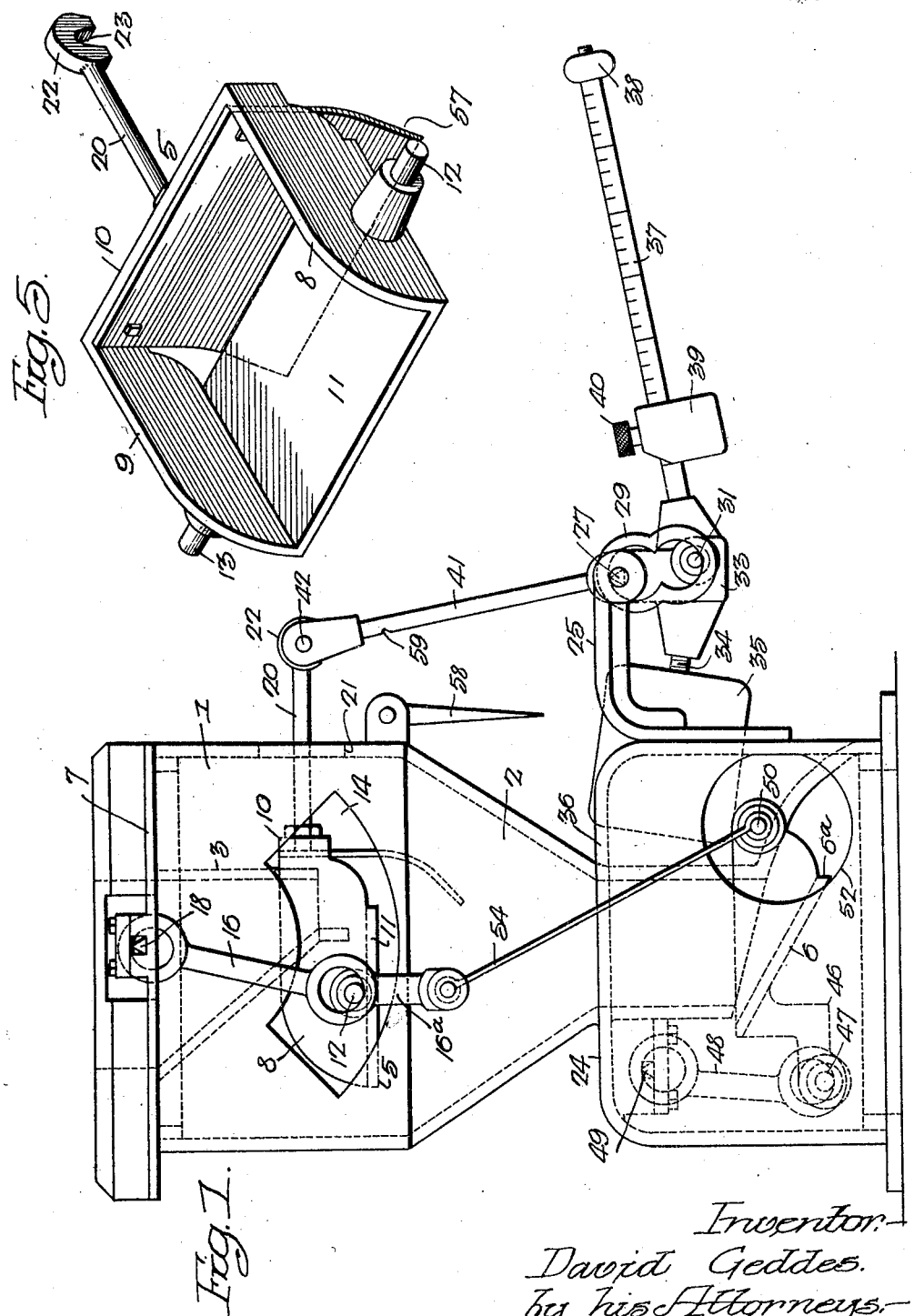

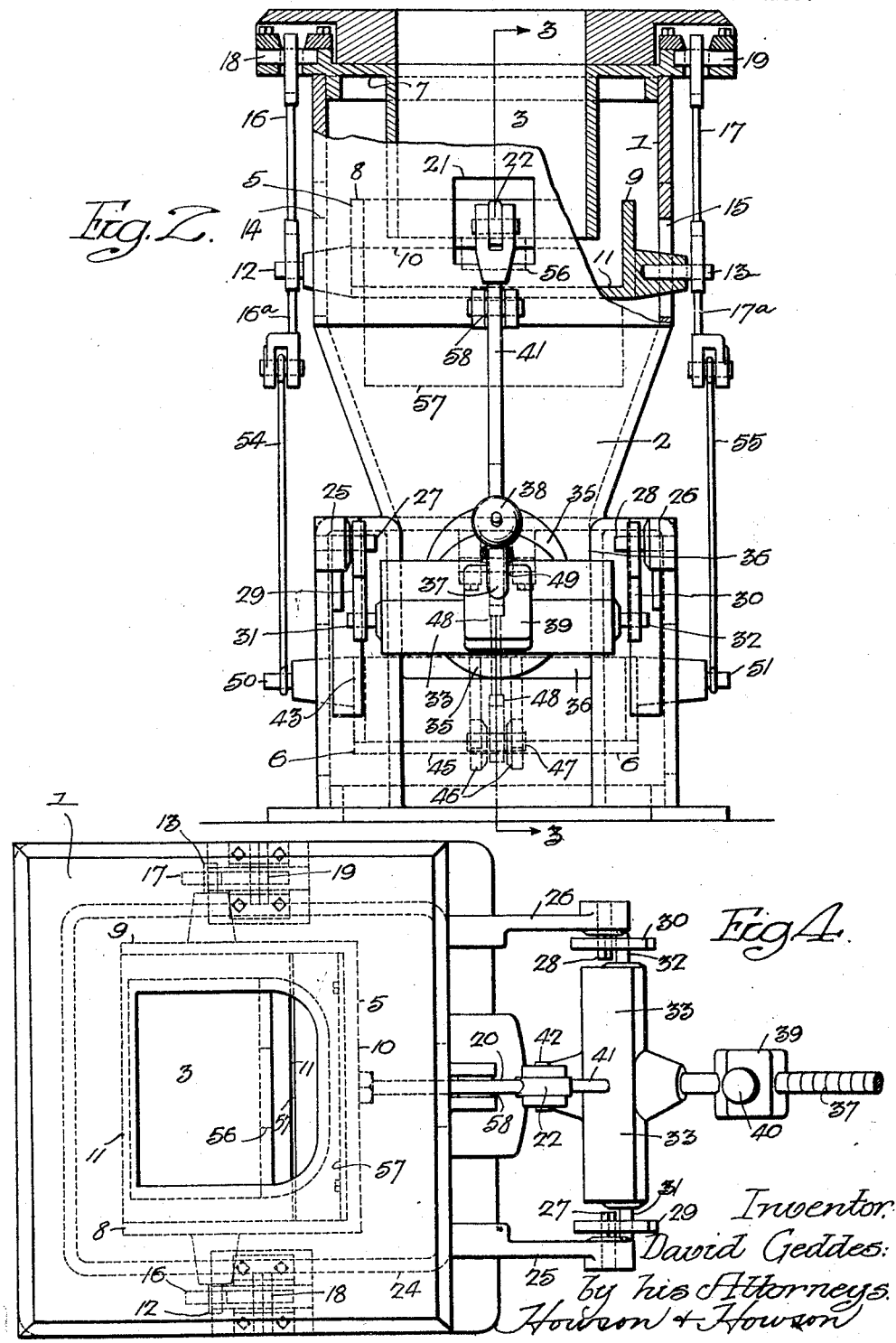

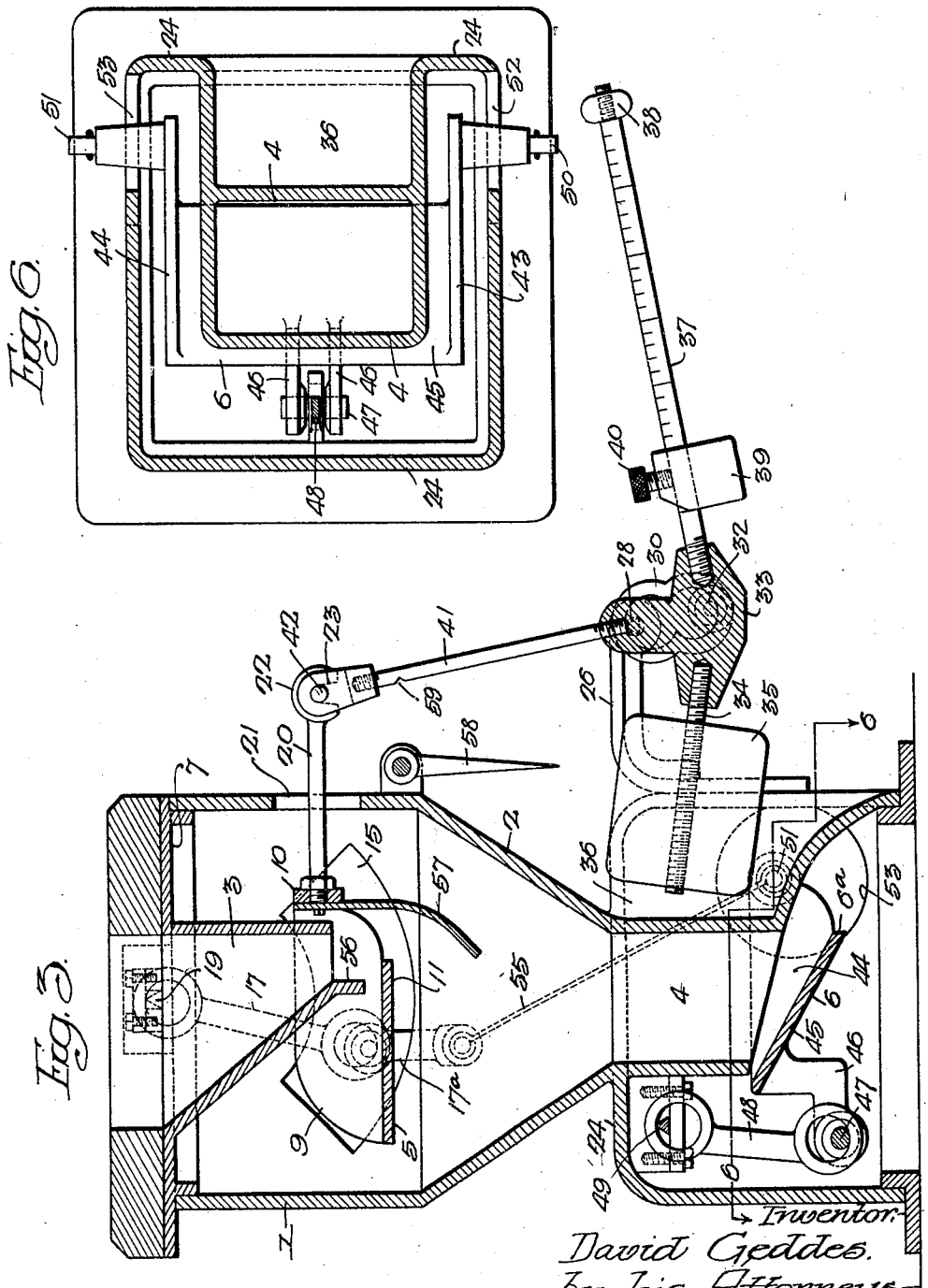

1,682,958

UNITED STATES PATENT OFFICE.

DAVID GEDDES, OF BERKELEY, CALIFORNIA.

FEED REGULATOR.

Application filed January 29, 1926. Serial No. 84,654.

The invention relates to devices or mechanisms for regulating or controlling the flow of liquid or granular material in a continuous uniform stream. A mechanism embodying the invention can be used for regulating the flow of water, oil and other liquids, or for regulating the flow of granular material, such as grain, sand, crushed rock, coal and the like. For the sake of convenience and simplicity, I shall herein refer to the device as being used for controlling the flow of grain, particularly wheat, but it will be understood that the invention is not limited to such use.

The principal object of the invention is to provide a regulator which will provide a uniform flow of material without any variation thereof on account of variations in the character of the material. In the case of wheat, the character of the material may vary as to smoothness, as to size of the grains, as to dampness, and otherwise, and the mechanism embodying the invention maintains a uniform flow notwithstanding these variations.

A further object of the invention is to provide a regulator which is so constructed and controlled as to avoid any tendency for periodic or oscillatory movements of the valves thereof, erratic and uneven flow being thus avoided.

A further object of the invention is to provide a feed regulator which has smooth surfaces, and which is so constructed that it cannot be clogged by foreign matter such as nails, straw and the like, and so constructed that such foreign material cannot change the rate of flow.

Still further objects of the invention will be apparent from the following specification and claims.

In the accompanying drawings, I have shown the embodiment of the invention which I now deem preferable, this embodiment being particularly adapted for grain, especially wheat. It will be understood, however, that the drawings are for illustrative purposes only, and are not to be construed as defining or limiting the invention, the claims forming a part of this specification being relied upon for that purpose.

Of the drawings:

Fig. 1 is a side view of a feed regulator embodying the invention.

Fig. 2 is an end view with certain parts broken away.

Fig. 3, is a vertical sectional view taken along the line 3—3 of Fig. 2.

Fig. 4 is a plan view.

Fig. 5 is a detailed view showing, in perspective, the upper valve.

Fig. 6 is a horizontal sectional view taken along the line 6—6 of Fig. 3.

Referring to the drawings, 1 represents the main casing of the apparatus, this casing preferably being rectangular in form. The casing 1 is connected with a hopper 2. Extending downward into the casing 1 is a substantially vertical supply duct 3, through which the material to be regulated is introduced into the apparatus. Connected with the hopper 2 is a vertical discharge duct 4. A valve 5 and a platform 6, adapted to be controlled in the manner hereinafter set forth, are associated respectively with the supply and guide ducts 3 and 4.

The supply duct 3 is preferably formed as a part of a cover 7 which extends over the top of the casing 1. The supply duct 3 extends through this cover and is adapted to be connected at its upper end with a suitable supply pipe or duct (not shown), through which the material to be regulated is supplied. It will be understood that this supply pipe is large enough to keep the duct 3 completely filled under ordinary operating conditions.

The valve 5 is horizontally movable under or across the discharge end of the supply duct 3, and serves to regulate the flow of material through the said duct. As illustrated the valve 5 comprises side walls 8 and 9, a front wall 10, and a bottom 11, which extends transversely between the side walls but which is spaced away from the front wall. The side walls 8 and 9 are far enough apart and are high enough to extend on both sides of the bottom part of the duct 3, when the valve is in its assembled position. As illustrated the valve 5 is supported by means of trunnions 12 and 13 which extend laterally, and which respectively project through slots 14 and 15 formed in the sides of the casing 1. Links 16 and 17 are provided at the respective sides of the casing; these links being supported on knife edges 18 and 19 mounted on the lateral projecting edges of the cover 7. The links 16 and 17 are provided with apertures into which the trunnions 12 and 13 respectively project. In this way the valve 5 is supported; but is at the same time free to move horizontally under the control of the mechanism to be described.

The front wall 10 of the valve 5 carries a horizontally projecting rod 20 which extends forward through an opening 21 in the casing 1.

At its forward end the rod 20 is provided with a head 22 having a pivot aperture therein. As shown, this aperture is in the form of a downward opening notch 23.

The casing 1 is supported upon and preferably formed integrally with a housing 24 which surrounds the discharge spout 4, and is preferably of about the same cross-sectional size and shape as the casing 1. Carried by the front wall of the housing 24 are two forward projecting brackets 25 and 26 provided with inward projecting studs 27 and 28. Carried by these studs are links 29 and 30 which engage trunnions 31 and 32 projecting laterally from a hub 33. Projecting rearward from the hub 33 is a bar 34 carrying a weight 35 which projects into a recess 36, formed in the housing 24. Projecting forward from the hub is a balance beam 37 carrying a fixed weight 38 at its extreme end, and also carrying a counterweight 39 which is adjustable along the beam. The weight 39 can be clamped in adjusted position by means of the screw 40. Projecting upward from the hub 33 is an arm 41 which is forked at its upper end and carries a pivot pin 42 fitting the before-mentioned bearing aperture 23 in the rod 20. It will be seen that the arm 41, co-operating with the rod 20, serves to support and balance the valve 5, the said valve being otherwise movable about the axis of the trunnions 12 and 13.

From the foregoing description, it will be apparent that the mechanism described serves to operate the valve 5 in a horizontal direction. The weight 35 is heavy enough to counterbalance the weights 38 and 39, and the result is that the weight 35 tends to move the arm 41 in the counter-clockwise direction and to thus hold the valve 5 in its extreme rearward or open position. The force tending to thus move the valve rearward can be reduced and regulated by adjusting the position of the weight 39 on the beam 34.

The platform 6, associated with the discharge duct 4, has side walls 43 and 44 and an inclined bottom 45 connecting the said side walls. The side walls are so spaced as to extend at each side of the duct 4 when the platform is in operative position. The platform 6 is provided at its rear end with a forked lug 46 carrying a bearing pin 47. A link 48 is provided, this link having at its lower end an aperture which receives the bearing pin 47. The link has at its upper end an aperture which receives a knife edge 49 carried by the upper part of the housing 24. By means of the construction described, the platform 6 is supended at its rear end so as to be capable of substantially horizontal movement. The platform is provided at its front end with laterally projecting trunnions 50 and 51 which project outward through openings 52 and 53 in the housing 24. The before mentioned links 16 and 17 are provided with downward extending extensions 16ª and 17ª which are pivotally connected with links 54 and 55. These links extend downward and forward, and at their lower ends engage the before-mentioned trunnions 50 and 51. By means of these links the forward end of the platform 6 is supported. It will be seen that by means of the links 54 and 55 the valve 5 and the platform 6 are connected together so that the position of one will to some extent control the position of the other.

Preferably in order to properly control the flow of material through the supply duct 3 and past the valve 5, I provide a depending flange 56 at the bottom of the rear wall of the supply duct, this flange extending quite close to the valve 5 and projecting into the material on the valve.

The front wall 10 of the valve preferably carries an apron 57 which extends downward and is curved rearward to direct the flow of material and to discharge it at a point vertically disposed above the discharge duct 4. Preferably as clearly shown, in Fig. 4, the front wall of the supply duct 3 is curved so as to be semi-circular in form, or substantially so. This causes the flow of material to be more or less concentrated toward the center of the mechanism when the valve 5 is partly closed. The material discharged from the apron 57 is delivered directly to the platform 6 and is then discharged therefrom over the edge 6ª thereof.

In order that the valve 5 may be entirely closed and held in closed position, I provide a suitable latch device. As illustrated a latch 58 is horizontally pivoted on the casing 1 at the front thereof, and the arm 41 is provided with a notch 59. By swinging the arm 41 forward and by setting the front end of the latch 58 in the notch 59, the valve 5 is held in its extreme forward position so as to entirely stop the flow of material.

When the regulator is idle, that is when no material is being supplied to it, the valve 5 is normally held wide open by the weight 35 and the platform 6 is in its upper position by the links 54 and 55. When material to be regulated is supplied to the regulator, this material initially passes freely through the supply duct 3 and past the valve 5. This flowing material is deflected by the apron 57 and falls directly from the lower edge of the apron onto the platform 6. The weight of the material falling on the platform 6 serves to move it downward, and, at the same time, to partly close the valve 5. It will be seen that the weight of the material impinging upon the platform 6 serves to overcome in part the tendency of the weight 35 to keep the valve 5 open and the platform 6 in its upper position. As the platform 6 is thus partly lowered and the valve 5 correspondingly closed, the valve 5 serves to cutoff or reduce the flow, and the result is that a condition of equilibrium is reached between the valve 5 and the platform 6, the condition being such that a steady uniform flow of material is permitted. It will be readily apparent that the positions of the valve and platform are controlled in part by the weight of the flowing material, and in part by the action of the counterweight 35 modified by the adjustable weight 39. By adjusting this latter weight, the position of the parts can be changed and the rate of flow can be correspondingly changed.

It will be understood that it is the weight of the material impinging upon and sliding upon the platform 6 which, for any given adjustment of the weight 39, regulates the amount of material flowing per unit of time. Let it be assumed that the material being regulated is wheat, and that the mechanism has been adjusted to provide the desired rate of flow for wheat of the average condition. If a quantity of wet wheat reaches the regulator, this will flow more slowly and the consequence is that there is less weight per unit of time impinging upon and sliding upon the platform 6. Therefore, there is a reduced tendency for the platform to hold the valve 5 closed, and the valve 5 opens to a slight extent, thus increasing the flow until the desired weight per unit of time impinges upon the platform.

Similarly if a quantity of particularly smooth and dry wheat reaches the regulator, this will flow more freely with the result that a greater weight per unit of time will impinge upon the platform 6. This greater weight tends to further lower the platform 6, and to correspondingly close the valve 5. The valve 5 is closed far enough to restrict the flow so that the required weight per unit of time impinges upon the platform.

It will be seen that when the valve 5 moves, the apron 57 moves with it, thus changing the position of the initial engagement of the material with the platform 6. Movement of the valve 5 in the opening direction (by reason of decreased flow as clearly explained) decreases the leverage of the position of engagement with respect to the pivotal support of the platform 6, but at the same time provides a greater distance between the position of engagement and the discharge edge 6ª. Thus the leverage of the inpact is somewhat decreased but the acutal weight of material sliding on the platform is increased. The net result is an increased tendency for the platform to move downward, this increase resulting not only from the rate of flow, but also from the increased length of the sliding contact. By reason of this cumulative action, the platform 6 serves to very quickly stop the opening movement of the valve 5.

Exactly the opposite action takes place when the valve 5 moves in the closing direction, and by reason of the cumulative action described the platform 6 serves to very quickly stop the closing movement of the valve 5.

The rapid building up of resistance to change of position, as described in the preceeding paragraphs, largely prevents any vibratory or oscillatory movement of the valve.

The flange 66 projecting into the material on the valve 5 serves as an additional stabilizer to mechanically dampen any vibratory or oscillatory movement.

From the foregoing description, it will be seen that the weight impinging upon the platform 6 must at all times be such as to exactly balance the weight mechanism comprising the weights 39, 37 and 36. Thus the flow is controlled to provide a definite weight per unit of time, and this rate of flow can be readily adjusted by adjusting the weight mechanism, that is by adjusting the position of the weight 39.

I claim:

1. The combination in a feed regulator, of a supply duct, a valve for regulating the flow of material through the duct, means tending to hold the valve in open position, a pivoted regulating platform onto which material is delivered from the supply duct, a connection between the platform and the valve for moving the valve in the closing direction when the platform is moved by material engaging therewith, and means automatically serving to change the position of the initial engagement of the material with the platform and thereby change the leverage of said platform in accordance with variations in the position of the valve.

2. The combination in a feed regulator, of a substantially vertical supply duct having one side thereof convex, a valve horizontally movable across the bottom of the duct for regulating the flow of material therethrough, means tending to hold the valve in open position, a pivoted regulating platform onto which material is delivered from the supply duct, a connection between the platform and the valve for moving the valve in the closing direction and toward the convex side of the duct when the platform is moved by material engaging therewith, and means automatically serving to change the position of the initial engagement of the material with the platform and thereby change the leverage of said platform in accordance with variations in the position of the valve.

3. The combination in a feed regulator, of a substantially vertical supply duct, a valve horizontally movable across the duct for regulating the flow of material through the duct, means tending to hold the valve in open position, a pivoted regulating platform onto which material is delivered from the supply duct, a connection between the platform and the valve for moving the valve in the closing direction when the platform is moved by material engaging therewith, and a deflector carried by the valve and automatically serving to change the position of the initial engagement of the material with the platform and thereby change the leverage of said platform in accordance with variations in the position of the valve.

4. The combination in a feed regulator, of a supply duct, a valve for regulating the flow of material through the duct, means tending to hold the valve in open position, a movable regulating platform onto which material is delivered from the supply duct, the said platform having an edge at one side thereof over which the material is discharged, a connection between the platform and the valve for moving the valve in the closing direction when the platform is moved by material engaging therewith, and means automatically serving to move the position of the initial engagement of the material with the platform toward the said discharge edge when the valve is moved in the closing direction and away from the said edge when the valve is moved in the opening direction, and thereby change the leverage thereof in accordance with variations in the position of the valve.

5. The combination in a feed regulator, of a supply duct, a valve for regulating the flow of material through the duct, means tending to hold the valve in open position, a movable regulating platform onto which material is delivered from the supply duct, the said platform having a horizontal pivotal support at one side thereof, and an edge opposite the pivotal support over which the material is discharged, a connection between the side of the platform opposite the pivotal support and the valve for moving the valve in the closing direction when the platform is moved by material engaging therewith, and means automatically serving to change the effective leverage of the platform by moving the position of the initial engagement of the material with the platform relatively to the pivotal support and relatively to the discharge edge, the movement being toward the discharge edge and away from the pivotal support when the valve is moved in the closing direction and away from the discharge edge and toward the pivotal support when the valve is moved in the opening direction.

6. The combination in a feed regulator, of a supply duct, a valve for regulating the flow of material through the duct, a weight mechanism comprising a main weight tending to hold the valve in open position and an adjustable counterweight acting in opposition to the main weight, a pivoted regulating platform onto which material is delivered from the supply duct, a connection between the platform and the valve for moving the valve in the closing direction when the platform is moved by material engaging therewith, the engagement of the material with the platform serving to balance the action of the weight mechanism, and means automatically serving to change the effective leverage of the platform by moving the position of the initial engagement of the material with the platform relative to the platform pivot in accordance with variations in the position of the valve.

7. The combination in a feed regulator, of a substantially vertical supply duct, a valve horizontally movable across the bottom of the duct and separated therefrom for regulating the flow of material through the duct, means tending to hold the valve in open position, a movable regulating platform onto which material is discharged from the supply duct, a connection between the platform and the valve for moving the valve in the closing direction when the platform is moved by material engaging therewith, and means fixed against movement with the valve and in position to extend into material thereon for dampening any oscillatory tendency of the valve.

8. The combination in a feed regulator, of a substantially vertical supply duct, a valve horizontally movable across the bottom of the duct for regulating the flow of material therethrough, two similar parallel links for movably supporting one end of the valve at the opposite sides thereof, an arm for controlling the movements of said valve said arm being horizontally pivoted below the level of the valve and having a pivotal connection therewith for supporting said valve at its opposite end, an adjustable weight mechanism connected with the arm and tending to hold the valve in open position, a pivoted regulating platform onto which material is delivered from the supply duct, and a connection between the platform and the valve for moving the valve in the closing direction when the platform is moved by material engaging therewith, the engagement of the material with the platform serving to balance the action of the weight mechanism.

9. The combination in a feed regulator, of a substantially vertical supply duct, a valve horizontally movable across the bottom of the duct for regulating the flow of material therethrough, two similar parallel links for movably supporting the valve, an arm horizontally pivoted below the level of the valve and having a pivotal connection therewith for controlling it, an adjustable weight mechanism connected with the arm and tending to hold the valve in open position, a movable regulating platform onto which material is delivered from the supply duct, a connection between the platform and the valve for moving the valve in the closing direction when the platform is moved by material engaging therewith, the engagement of the material with the platform serving to balance the action of the weight mechanism, and a latch adapted to engage the arm for holding the valve in closed position.

10. The combination in a feed regulator of a substantially vertical supply duct, and a valve extending substantially around said duct adapted to be horizontally movable across the bottom of the duct for regulating the flow of material therethrough, the said valve comprising side walls at opposite sides of the duct, a front wall in front of the duct and a floor between the side walls and spaced from the front wall.

11. The combination in a feed regulator, of a substantially vertical supply duct, a valve extending substantially around said duct adapted to be horizontally movable across the bottom of the duct for regulating the flow of material therethrough, the said valve comprising side walls at opposite sides of the duct, a front wall in front of the duct and a floor between the side walls and spaced from the front wall, and a deflector for the material carried by the front wall of the valve.

12. The combination in a feed regulator, of a substantially vertical supply duct, a valve horizontally movable across the bottom of the duct for regulating the flow of material therethrough, the said valve comprising side walls at opposite sides of the duct, a front wall in front of the duct and a floor between the side walls and spaced from the front wall, two similar parallel links for movably supporting the valve, an arm horizontally pivoted below the level of the valve and having a pivotal connection therewith for controlling it, an adjustable weight mechanism connected with the arm and tending to hold the valve in open position, a movable regulating platform onto which material is delivered from the supply duct, and a connection between the platform and the valve for moving the valve in the closing direction when the platform is moved by material engaging therewith, the engagement of the material with the platform serving to balance the action of the weight mechanism.

13. The combniation in a feed regulator, of a substantially vertical supply duct, a valve horizontally movable across the bottom of the duct for regulating the flow of material therethrough, the said valve comprising side walls at opposite sides of the duct, a front wall in front of the duct and a floor between the side walls and spaced from the front wall, a deflector for the material carried by the front wall of the valve, two similar parallel links for movably supporting the valve, an arm horizontally pivoted below the level of the valve and having a pivotal connection therewith for controlling it, an adjustable weight mechanism connected with the arm and tending to hold the valve in open position, a movable regulating platform onto which material is delivered from the supply duct, and a connection between the platform and the valve for moving the valve in the closing direction when the platform is moved by material engaging therewith, the engagement of the material with the platform serving to balance the action of the weight mechanism.

14. The combination in a feed regulator, of a substantially vertical supply duct, a valve horizontally movable across the bottom of the duct for regulating the flow of material therethrough, two similar parallel links for movably supporting the valve, a horizontally pivoted hub below the level of the valve, an arm extending upward from the hub and having a pivotal connection with the valve for controlling it, a weight carried by the hub and tending to move the arm to hold the valve in open position, a balance arm carried by the hub, a counterweight adjustable along the balance arm and acting in opposition to the first said weight, a movable regulating platform onto which material is delivered from the supply duct, and a connection between the platform and the valve for moving the valve in the closing direction when the platform is moved by material engaging therewith, the engagement of the material with the platform serving to balance the action of the said weights.

15. The combinaton in a feed regulator, of a supply duct, a valve regulating the flow of material through the duct, means tending to hold the valve in open position, a movable regulating platform onto which material is delivered from the supply duct, a pivoted link for supporting the platform at one end, and two parallel links connected with the valve for supporting the platform at the other end, the last said links serving to move the valve in the closing direction when the platform is moved by material engaging therewith.

16. The combination in a feed regulator, of a supply duct, a valve regulating the flow of material through the duct, means tending to hold the valve in open position, a movable regulating platform onto which material is delivered from the supply duct, a guide duct between the valve and the platform, side walls for the platform at opposite sides of the guide duct, a pivoted link for supporting the platform at one end, and two parallel links connected with the valve for supporting the platform at the other end, the last said links serving to move the valve in the closing direction when the platform is moved by material engaging therewith.

DAVID GEDDES.